March 21, 1944.  E. E. HEWITT  2,344,868
VARIABLE LOAD BRAKE
Filed Jan. 31, 1942   3 Sheets-Sheet 1
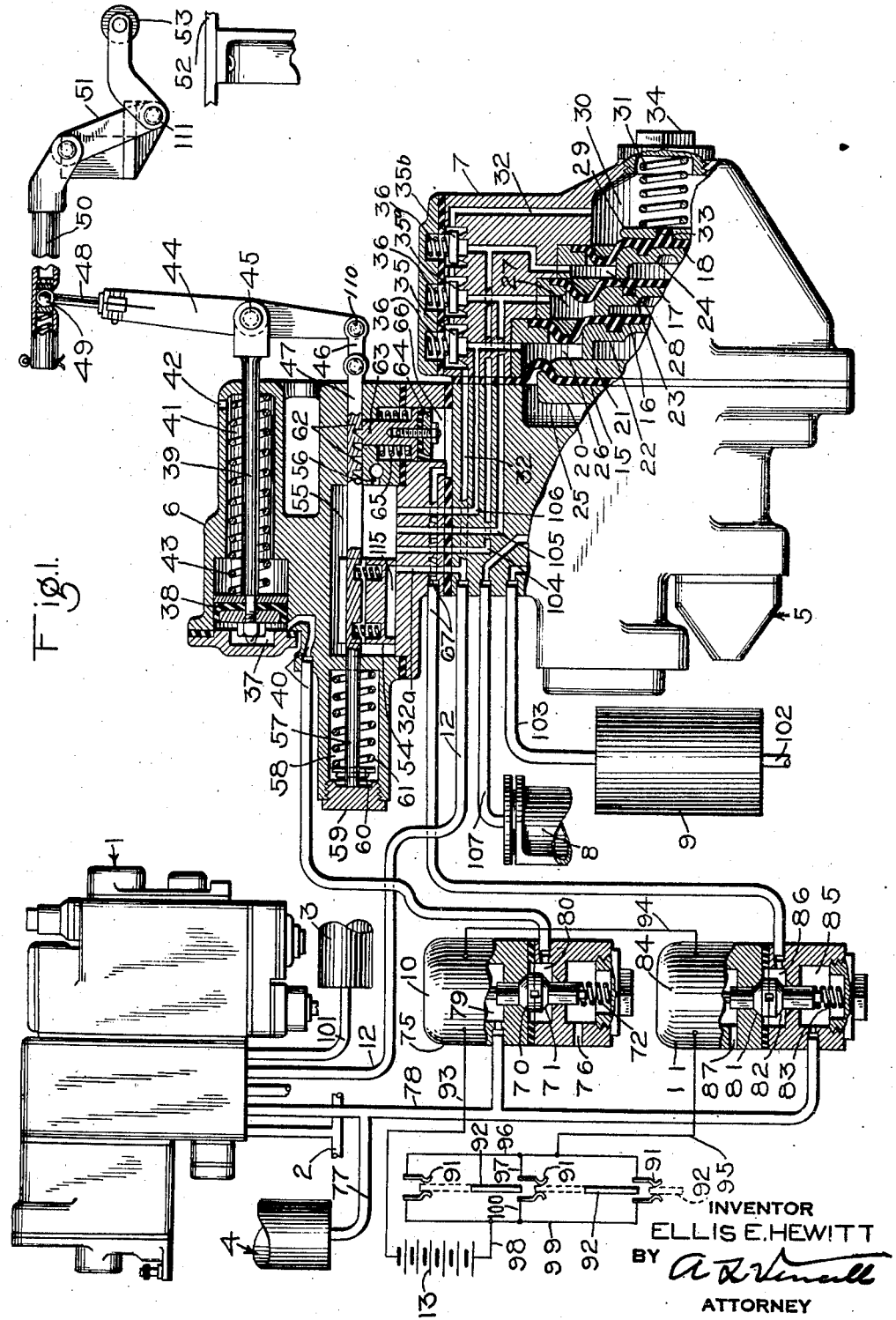
INVENTOR
ELLIS E. HEWITT
BY
ATTORNEY

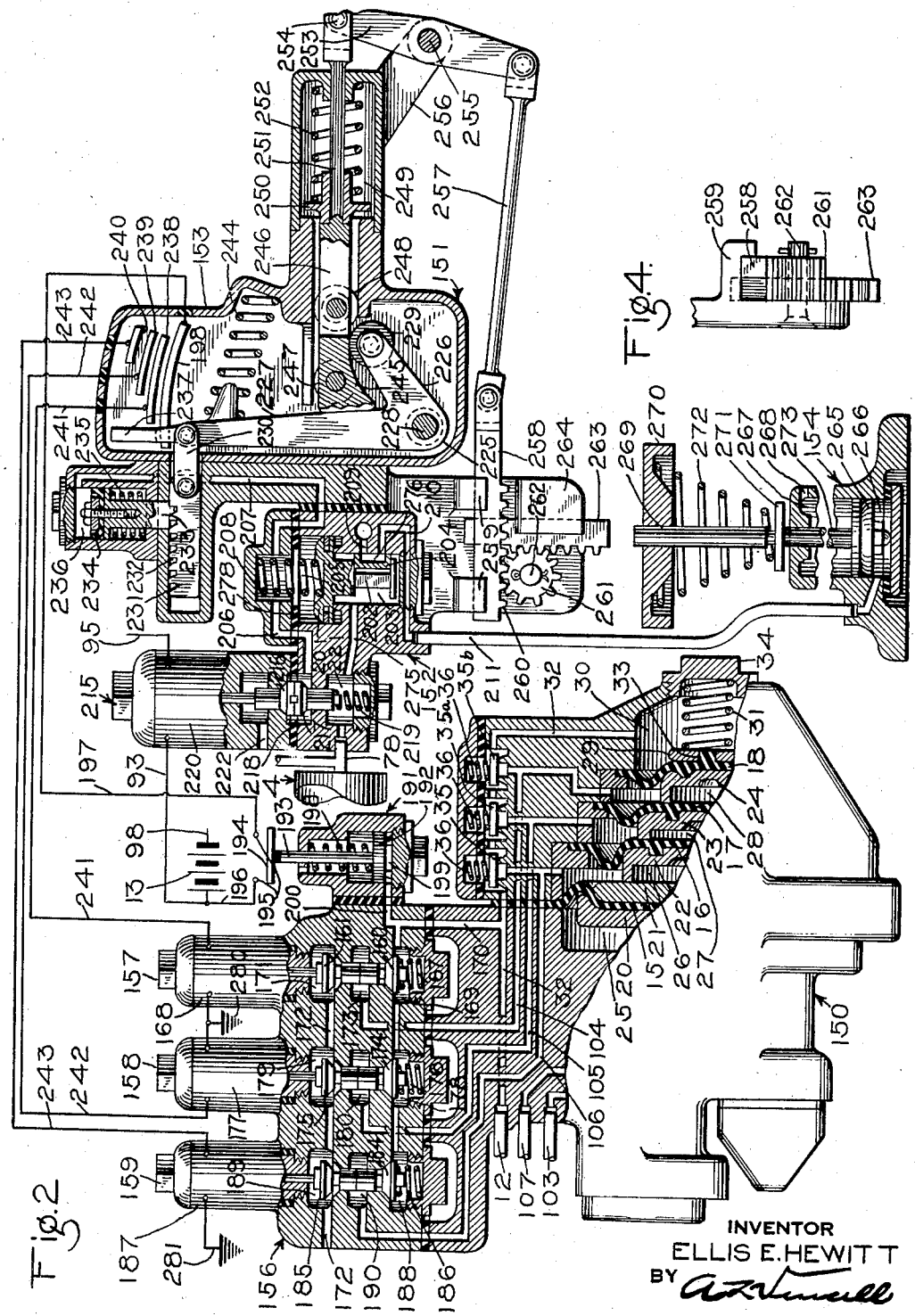

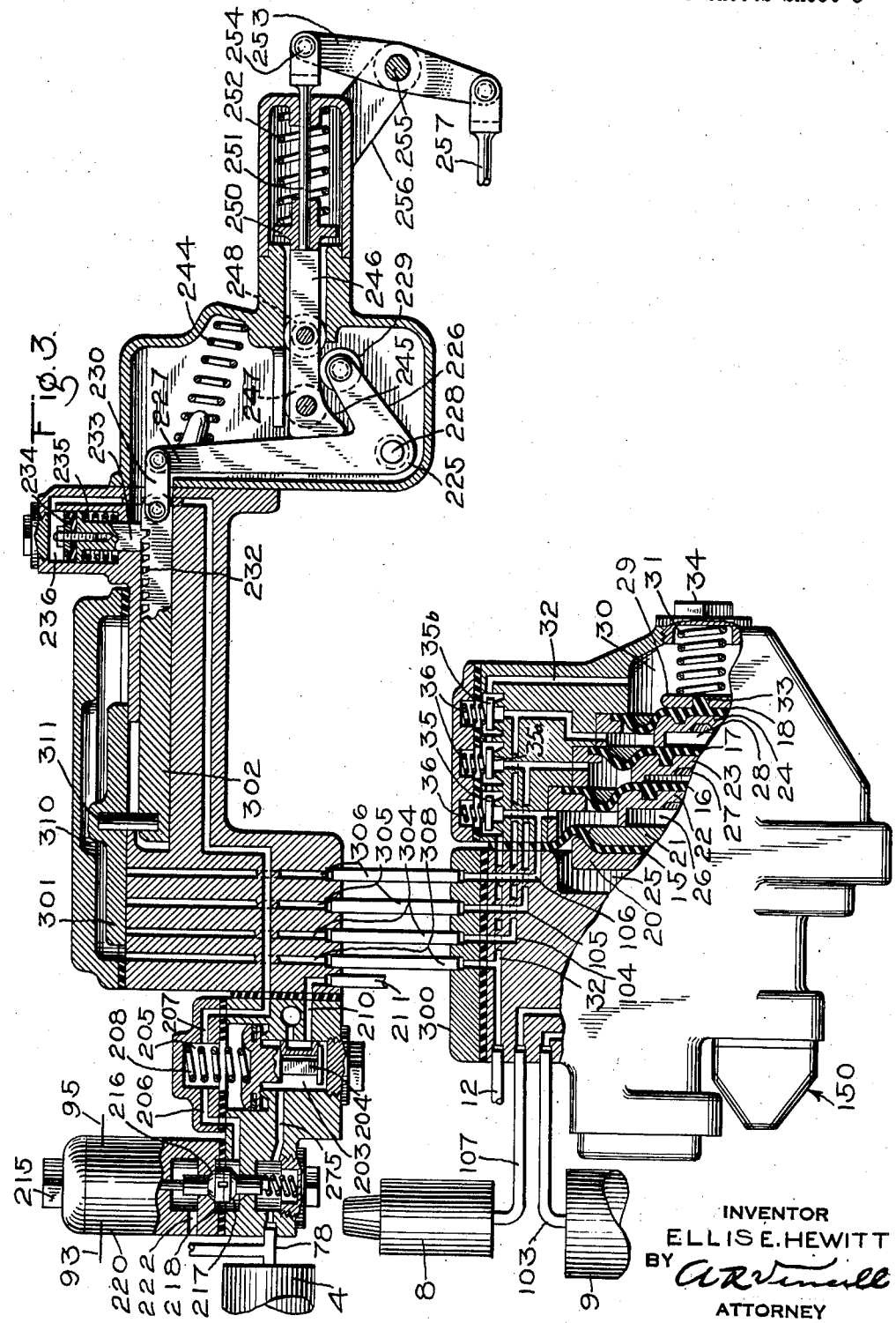

Patented Mar. 21, 1944

2,344,868

UNITED STATES PATENT OFFICE 2,344,868

VARIABLE LOAD BRAKE

Ellis E. Hewitt, Edgewood, Pa., assignor to The Westinghouse Air Brake Company, Wilmerding, Pa., a corporation of Pennsylvania Application January 31, 1942, Serial No. 429,034

27 Claims. (Cl. 303—22)

This invention relates to fluid pressure brakes for vehicles, and more particularly to a brake apparatus adapted to vary the braking power according to the load on the vehicle.

The principal object of my invention is to provide an improved vehicle variable load brake apparatus having means operative upon some necessary operation which must be performed periodically such, for instance, as opening a door of the vehicle, for varying the pressure of fluid obtainable in the brake cylinder according to the load carried.

Another object of my invention is to provide an improved vehicle variable load brake apparatus having means automatically adjustable according to the load on the vehicle and operative upon the opening of the vehicle door for controlling the pressure of fluid obtainable in the brake cylinder.

A further object of the invention is to provide a vehicle fluid pressure brake equipment which is capable of producing a plurality of different brake cylinder pressures and which is adapted to be automatically conditioned to produce the proper brake cylinder pressure suitable for the vehicle in accordance with the load carried by the vehicle.

Other objects and advantages will appear in the following more detailed description of the invention.

In the accompanying drawings

Fig. 1 is a diagrammatic view, partly in section, of a fluid pressure brake equipment embodying the invention.

Fig. 2 is a fragmentary diagrammatic view, partly in section, illustrating another form of brake equipment embodying my invention.

Fig. 3 is a fragmentary diagrammatic view, partly in section, illustrating another form of equipment embodying the invention.

Fig. 4 is a fragmentary end elevational view of a portion of Fig. 2.

*Description of embodiment shown in Fig. 1*

Referring to Fig. 1 the variable load brake apparatus may comprise, as shown, a brake controlling valve device 1, a brake pipe 2, an auxiliary reservoir 3, a supply reservoir 4, a variable load brake controlling mechanism 5 comprising a valve device having a regulation portion 6 and a relay valve portion 7, a brake cylinder 8, a storage reservoir 9, a pair of magnet valve devices 10 and 11 and a source of electrical energy which, as illustrated in the present embodiment of the invention is in the form of a storage battery 13.

The brake controlling valve device 1 is what is known as the "D-22" type and may be of substantially the same construction as the corresponding control valve device shown and described in detail in Patent No. 2,152,257 of Ellis E. Hewitt and Donald L. McNeal, issued March 28, 1939. For simplicity in showing the emergency reservoir, the displacement volume device and the straight air pipe all of which are usually associated with and connected to this type of control valve device have been omitted since they are not necessary to a clear understanding of the present invention.

The brake controlling valve device 1 is employed for the purpose of controlling the application and release of the brakes, and to effect such control is operative upon a service reduction in brake pipe pressure to supply fluid under pressure from the auxiliary reservoir 3 to the relay valve portion 7 of the variable load brake controlling mechanism 5 and is operative to vent fluid under pressure from the relay valve portion in response to an increase in brake pipe pressure. The supply of fluid under pressure to and the release from the relay valve portion is by way of a pipe 12 which connects said valve portion to the brake controlling valve device 1. The relay valve portion of the variable load brake controlling mechanism is operative in response to the pressure of fluid supplied thereto and the venting of fluid therefrom, as will hereinafter be more fully described.

The variable load brake controlling valve device 5 is provided for the purpose of controlling the supply of fluid under pressure to and the release of fluid under pressure from the brake cylinder 8, the supply in the present embodiment of the invention being from the normally charged reservoir 9 and the release being to the atmosphere. This device as hereinbefore mentioned comprises a regulating or changeover portion 6 and a relay valve portion 7.

The relay valve portion 7 shown in the drawings may be the same general type as that shown and described in Patent No. 2,236,268 of E. E. Hewitt, issued March 25, 1941, assigned to the assignee of the present application and may be briefly described as comprising a casing in which there is operatively mounted a fluid pressure supply and release valve mechanism, not shown, and a differential diaphragm assemblage which is operative to effect the operation of the valve mechanism. The supply and release valve mechanism is of the self-lapping type comprising a supply valve and a release valve for controlling respectively the supply of fluid under pressure from the storage reservoir 9 to the brake cylinder 8 and the release of fluid under pressure from the brake cylinder.

The differential diaphragm assemblage for operating the valve mechanism comprises a series of movable abutments in the form of flexible diaphragms 15, 16, 17, and 18 of successively smaller effective pressure areas in the order named, the diaphragms being suitably clamped at the periphery thereof by the casing and disposed in spaced coaxial relation.

At one side of the largest diaphragm 15 is a follower plate or disc 20 which is operatively connected to a plunger, not shown, for effecting operation of the self-lapping valve mechanism and suitably attached to the opposite side of this diaphragm is a follower member 21. The diaphragms 15, 16, 17 and 18 are operatively associated with each other and are maintained spaced apart by means of spacers or follower members 22, 23, and 24, which are disposed between the diaphragms 15 and 16, 16 and 17 and 17 and 18, respectively. It will be noted that the diaphragms are not positively connected together so that they are free to move individually or collectively, as the case might be to control the self-lapping valve mechanism.

One surface of the diaphragm 15 and the inner surface of the casing defines a chamber 25 in which the self-lapping valve mechanism is located; the adjacent faces of the diaphragms 15 and 16 and an inner surface of the casing defines a chamber 26; the adjacent faces of the diaphragms 16 and 17 and an inner surface of the casing defines a chamber 27; the adjacent faces of the diaphragms 17 and 18 and an inner surface of the casing defines a chamber 28 and the other surface of the diaphragm 18 and an inner surface of the casing defines a chamber 30.

Contained in chamber 30 is a bias spring 31 which acts through a plate 29 against the adjacent face of the diaphragm 18, said plate being supported in coaxial relation with said diaphragm on a boss 33 projecting from the adjacent face of the diaphragm. The outer end of the spring is supported in a cap nut 34 having screw-threaded engagement with the casing and is employed to hold the several diaphragms and the followers interposed between, in engagement with each other to avoid rattling or shaking of the parts when the brakes on the vehicle are released. The chamber 30 is constantly connected to the pipe 12 leading to the brake controlling valve device 1 through a passage 32.

Interposed between the chambers 26, 27 and 28 and the passage 32 are check valves 35, 35a and 35b, respectively, which are yieldingly biased into seated relation on an associated valve seat by lightly tensioned return springs 36. Whenever a reduction in the pressure of the fluid in the passage 32 occurs, as a result of a reduction in the pressure of the fluid in the pipe 12, the check valve 35, 35a and 35b are unseated by the higher pressure in chambers 26, 27 and 28 to cause substantially simultaneous reduction, to a corresponding degree, in the pressure of the fluid contained in the chambers 26, 27, and 28. The purpose of this feature will be understood more clearly from subsequent description.

The regulating or changeover portion 6 of the variable load brake controlling mechanism 5 is provided for the purpose of selectively cutting the chambers 26, 27, and 28 into communication with the pipe 12 and is operative according to the load on the vehicle to its several selecting positions. This portion of the valve device may comprise a casing containing a piston 38 having a piston rod or stem 39 which extends to the exterior of the casing. At one side of piston 38 is a chamber 37 which is in constant open communication with a passage and pipe 40 leading to the magnet valve device 10. At the opposite side of the piston is a chamber 41 which is in constant open communication through a passage 42 with the atmosphere.

Contained in chamber 41 and interposed between and operatively engaging the piston 38 and the casing is a spring 43 which tends, at all times, to move said piston to its extreme left hand or empty vehicle position, as shown in Fig. 1 of the drawings.

The outer end of the piston rod or stem 39 is pivotally connected to a lever 44 by means of a pin 45 which passes through the lever at a point between the ends of the lever. One end of the lever 44 is pivotally connected to one end of a link 46, which link at its opposite end, is connected to a longitudinally movable ratchet bar 47. The other end of lever 44 is connected, by means of an adjusting lever extension 48 and a link 49, with a rod 50, which rod in turn is pivotally connected at its outer end with one arm of a bell crank 51, carried by the vehicle body. A member 52 carried by the car truck is positioned to be engaged by a roller 53 carried by the outer end of the other arm of the bell crank 51.

The ratchet bar 47 is slidably mounted in the casing for longitudinal movement and is arranged to operate a selector slide valve 54 contained in a chamber 55, which chamber is constantly connected by way of a passage 56 with the atmosphere. The ratchet bar is provided at its inner end with an extension 57 which is slidably guided and supported in the casing. This extension extends into a bore 58 and within the bore is provided with a collar 60. The open end of this bore is closed by a nut 59 having screw-threaded engagement with the casing. Contained in the bore 58 and interposed between and operatively engaging the collar and the inner end of the bore is a spring 61 which tends, at all times, to urge the ratchet bar in a direction toward the left hand into the position in which it is shown in Fig. 1 of the drawings.

The ratchet bar is also provided with teeth 62 which are adapted to be engaged by a pawl 63. This pawl is connected to a piston 64, subject on one side to the pressure of a spring 65 and subject on the opposite side to the pressure of fluid in a piston chamber 66, which is connected to the magnet valve device 11 by way of a passage and pipe 67.

The magnet valve device 10 comprises a pair of oppositely seating valves, 70 and 71, which are yieldingly urged by a spring 72 into seated and unseated positions, respectively, and which are actuated against the force of the spring 72 into unseated and seated positions, respectively, upon energization of an electromagnet 75. With the valve 71 unseated as shown communication is established from pipe and passage 40 connected to chamber 37, to an atmospheric passage 76, this communication being closed when the valve 71 is seated. When the valve 70 is unseated communication is established from the supply reservoir 4 to the pipe 40, by way of pipes 77, and 78, a chamber 79 in the magnet valve device, past unseated valve 70 and a chamber 80 to charge the chamber 37 with fluid under pressure this communication being closed when the valve 70 is seated.

The magnet valve device 11 is identical in construction to the magnet valve device 10 and comprises a pair of oppositely seating valves, 81 and 82, which are yieldingly urged into seated and unseated positions respectively by a spring 83 and actuated against the force of the spring 83 into unseated and seated positions, respectively, upon energization of an electromagnet 84. With the valve 82 unseated, as shown, communication is established from the supply reservoir 4 to the pipe 67, so that fluid under pressure in supply reservoir 4 flows to the piston chamber 66 to charge it, by way of pipes 77 and 78, a chamber 85 in the magnet valve device 11, past unseated valve 82 and a chamber 86, this communication being closed when the valve 82 is seated. With the valve 81 unseated, communication is established from the pipe and passage 67 leading from chamber 66, to the atmospheric passage 87, this communication being closed when the valve 81 is seated.

The electric circuit for controlling the operation of the electromagnets 75 and 84 is of the normally open type which is controlled by operation of the vehicle doors. One end of the coil or winding of the electromagnet 75 is connected to the positive terminal of the storage battery 13 by means of a conductor 93 and the other end of the coil or winding is connected to one end of the coil or winding of the electro-magnet 84 by means of a conductor 94. The other end of the coil or winding of electro-magnet 84 is connected to one terminal of each of a plurality of door switches 91 by means of a conductor 95 and connected conductors 96 and 97. The other terminal of each of the door switches is connected to the negative terminal of the storage battery 13 by means of connected conductors 98, 99 and 100.

*Operation of embodiment shown in Fig. 1*

In initially charging the brake system fluid under pressure supplied to the brake pipe in the usual manner flows to the auxiliary reservoir by way of the brake controlling valve device 1 and a pipe 101. Fluid under pressure also flows from the brake pipe by way of the brake controlling valve device 1 to pipe 78 and therefrom through pipe 77 to the supply reservoir 4. Fluid under pressure also flows from the pipe 79 to the chambers 79 and 85 of the magnet valve devices 10 and 11, respectively.

The storage reservoir 9 which is provided for the purpose of storing fluid under pressure to be supplied to the brake cylinder may be charged directly from a suitable fluid pressure supply source, such as a compressor or main reservoir by way of a pipe 102. Fluid under pressure thus supplied to reservoir 9 flows therefrom to the usual supply chamber of the relay valve portion 7 of the variable load brake control mechanism 5 through a pipe 103, from whence fluid under pressure is supplied to the brake cylinder 8 upon operation of the valve mechanism to application position as hereinafter described.

When a vehicle equipped with the above described variable load brake equipment is charged with fluid under pressure and is running along the road empty with all the car doors 92 closed, as shown in full lines in Fig. 1, the switches 91 will be open, so that the electro-magnets 75 and 84 will be deenergized. With the electro-magnets 75 and 84 deenergized, the double beat valves 70 and 71 of magnet valve device 10 and the double beat valves 81 and 82 of the magnet valve 11 will be in the position shown in Fig. 1 of the drawings.

With the double beat valves 70 and 71 positioned as shown the chamber 37 in the variable load control mechanism is open to the atmosphere, by way of passage and pipe 49, past unseated valve 71 and through atmospheric passage 76. From this it is obvious that there will be no fluid pressure acting on piston 38 so that the spring 43 acts to maintain the piston 33 in its extreme left hand position as shown in Fig. 1. With the piston and attached piston rod or stem 39 and consequently the lever 44 thus positioned, the bell crank 51 at the outer end of the attached rod 50 will be in the position shown so that the free arm thereof will maintain the roller 53 away from or out of contact with the member 52, so that the usual relative movement between the truck and the vehicle body, while the vehicle is in motion, will have no effect upon the bell crank thus preventing the transmission of damaging forces to the bell crank and associated parts.

Under these conditions the spring 61 acting through the collar 60 and extension 57 will maintain the ratchet bar 47 and selector slide valve 54 in the position shown in the drawings. With the selector slide valve 54 thus positioned the chambers 26, 27 and 28 of the relay portion 7 are connected to the atmosphere by way of passages 106, 105 and 104, respectively, chamber 55 and atmospheric passage 56. As hereinbefore mentioned the chamber 30 is in constant open communication with passage 32 and pipe 12, which pipe is connected to the atmosphere through the brake controlling valve device 1, in the usual manner, when said valve device is in brake release position.

Since the diaphragm chambers 26, 27, 28, and 30 are all connected to the atmosphere as just described the self-lapping valve mechanism contained in the relay valve portion 7 is maintained in its release position thus connecting the brake cylinder 8 to the atmosphere to maintain the brakes on the vehicle released.

With the double beat valve 81 and 82 positioned as shown communication is established for supplying fluid under pressure from the supply reservoir 4 and connected pipe 78 through pipe and passage 67 to the piston chamber 66. Upon the supply of fluid under pressure to chamber 66 the piston 64 is moved upwardly against the opposing pressure of the spring 65 to hold the pawl 63 in engagement with the teeth 62 of the bar 47, thereby locking the ratchet bar 47 and selector slide valve 54 in the position shown.

*Application of the brakes on an empty vehicle*

When the brake pipe pressure is reduced to effect an application of the brakes the brake controlling valve device 1 functions in the usual well known manner to supply fluid under pressure from the auxiliary reservoir 3 to diaphragm chamber 30 of the relay valve portion 7 by way of pipe 12 and passage 32, the flow of fluid from the auxiliary reservoir to the brake controlling valve device being by way of pipe 101. Fluid under pressure supplied to chamber 30 causes the diaphragm assemblage to function to actuate the valve mechanism to first seat the exhaust valve and to then unseat the supply valve. With the supply and exhaust valve thus positioned fluid under pressure flows from the storage reservoir 9 through pipe 103 to the chamber 25 and from thence to the brake cylinder 8 by way of a pipe 107. When the pressure of fluid in chamber 25 and acting on diaphragm 15 becomes high enough to overcome the opposing pressure of fluid in chamber 30 acting on the diaphragm 18 the diaphragm assemblage will be shifted in a direction toward the right hand, permitting the supply valve to seat thereby cutting off further flow of fluid under pressure to chamber 25. With the flow of fluid thus cut off there will be no further increase in the pressure in chamber 25, consequently the diaphragm assemblage will come to a stop before the release valve can be unseated. When this occurs the brakes will be maintained applied with a pressure called for by the relay valve portion.

From the foregoing it will be apparent that with only the diaphragm chamber 30 charged with fluid under pressure the pressure established in the brake cylinder 8 is determined by the relation of the effective pressure area of the diaphragm 18 to the effective pressure area of the diaphragm 15, thus the pressure established in the brake cylinder will be proportionate to the pressure established in pipe 12 and connected chamber 30 when the vehicle is empty.

Now when the brake pipe pressure is increased to effect a release of the brakes the brake controlling valve device 1 will function to establish communication from the pipe 12 to the atmosphere so that fluid under pressure will be vented from chamber 30. With the chamber 30 thus vented the fluid at brake cylinder pressure present in chamber 25 and acting on the diaphragm 15 will cause the diaphragm assemblage to move further in a direction toward the right hand. Upon such movement the self-lapping valve mechanism will operate to unseat the exhaust valve and thereby permit fluid under pressure to flow from the brake cylinder by way of pipe 107 to the atmosphere, thus releasing the brakes.

When the vehicle is brought to a stop and one or more of the vehicle doors 92 are opened as shown in dotted lines in Fig. 1, the circuit of electro-magnets 75 and 84 will be closed through the switches 91. The energization of electro-magnet 84 seats the valve 82 and unseats the valve 81. With the valve 81 unseated, fluid under pressure in the piston chamber 66 of the variable load brake controlling mechanism 5 will be vented to the atmosphere through passage and pipe 67, chamber 86 in the magnets valve device 11, past unseated valve 81 and through atmospheric exhaust passage 87. The reduction of fluid pressure in chamber 66 permits the spring 65 to force the piston 64 downwardly drawing the pawl 63 out of locking engagement with a tooth 62 of the ratchet bar 47.

The energization of electro-magnet 75 seats the valve 71 and unseats the valve 70, and the fluid under pressure in the supply reservoir 4 is permitted to flow to the chamber 37 of the regulating portion of variable load brake controlling mechanism 5, by way of pipe 77 and 78, chamber 79 of the magnet valve device 10, past unseated valve 70, chamber 80 and pipe 40.

Fluid under pressure supplied to chamber 37 causes the piston 38 and attached piston rod 39 to move outwardly against the opposing pressure of spring 43. The piston rod as it thus moves causes the lever 44 to rock in a clockwise direction about a pin 110, which pin at this time is maintained stationary by the link 46 and connected bar 47 which in turn is held stationary by the spring 61.

The lever 44 as it is thus rocked causes the rod 50 to move longitudinally in the direction toward the right hand, the rod as it moves imparting a clockwise rotary movement to the bell crank 51 about pivot pin 111 until such movement is stopped by the engagement of the bell crank roller 53 with the fixed part 52 of the truck. It will here be understood that since the vehicle is empty the piston 38 will have made its full traverse at the time the roller 53 engages with the fixed part 52 of the truck so that even though the locking pawl 63 is in its unlocked position the bar 47 and associated slide valve 54 will not be caused to move from their empty position.

Now as the vehicle is loaded the vehicle body will move downwardly, due to the compression of the body supporting springs by the increasing load, relative to the fixed part 52 of the vehicle truck. The bell crank since it is carried by the vehicle body and is in operative engagement with the fixed part 52 of the truck is carried to rock in a counterclockwise direction about its pivot in response to the downward movement of the vehicle body. The bell crank as it thus moves causes the rod 50 to be moved longitudinally in a direction toward the left hand, the bar in its movement shifting the connected end of the lever 44 in the same direction. Since the piston 38 and piston rod 39 are in their extreme right hand position the lever 44, due to its movement by the rod 50, will rock in a counterclockwise direction about the pin 45. This movement of the lever 44 will continue as long as the load on the vehicle is being increased until the vehicle is fully loaded.

The lever 44 as it rocks in response to the increasing load on the vehicle pulls the bar 47 longitudinally and consequently the slide valve 54 toward the right hand against the opposing pressure of the spring 41, the slide valve 44 assuming any one of its three load positions depending upon the degree of increase of the load.

When the vehicle has been loaded, the vehicle doors are closed, the doors as they move from their open position, opening the circuit through the switches 91 and electro-magnets 75 and 84 thus effecting the deenergization of electro-magnets 75 and 84.

With the electro-magnet 84 deenergized, the spring 83 acts to unseat the valve 82 and to seat valve 81. With the valve 82 unseated, fluid under pressure from the supply reservoir 4 is again supplied to the piston chamber 66 through the circuit hereinbefore traced. When the pressure of fluid in piston chamber 66 has been increased to a degree sufficient to overcome the opposing pressure of spring 65, the piston is moved upwardly causing the pawl 63 to engage one of the teeth of the ratchet bar 47, thus locking the ratchet bar and attached selector slide valve 54 in the proper adjusted position.

When the electro-magnet 75 is deenergized the spring 74 acts to seat valve 70 and to unseat valve 71. With the valve 71 unseated, chamber 37 of the regulating portion 6 is vented to the atmosphere through a circuit previously traced in the foregoing description. The reduction of the pressure of fluid in chamber 37 due to such venting permits the spring 43 to force the piston and attached piston rod 39 to the left to its retracted position thereby causing the lever 44 to rotate in a counter-clockwise direction about the now stationary pivot pin 110. The lever 44 as it is thus moved causes the rod 50 to move in a direction toward the left, thus rocking the bellcrank 51 in a clockwise direction about the pivot pin 111 so that the roller 53 is moved out of engagement with the member 52, for the purpose hereinbefore described.

As hereinbefore mentioned the selector slide valve 54 will be positioned according to the load on the vehicle. If the vehicle is fully loaded the slide valve will assume its full load position in which a branch passage 32a, leading from the passage 32, is connected by way of a cavity 115 in the slide valve 54 to the passages 106, 105, and 104 leading to the diaphragm chamber 26, 27, and 28, respectively. If the vehicle is only lightly loaded the slide valve will be positioned so that the cavity 115 therein will connect the passage 32a to the passage 104, and if the vehicle is more heavily loaded, but not fully loaded, the slide valve will be positioned so that the cavity 115 will connect the passage 32a to the passage 104 and 105.

When it is desired to effect an application of the brakes, fluid under pressure from the brake controlling valve device 1 will be supplied through pipe 12 and passage 32 to chamber 30 of the relay valve portion 7 as hereinbefore described in connection with an application of the brakes on an empty vehicle. As above described the selector slide valve 54 will be positioned according to the load on the vehicle, thus if the vehicle is fully loaded fluid under pressure supplied to passage 32 will also flow by way of passage 32a, cavity 115 in side valve 54 and passages 106, 105, and 104 to chamber 26, 27, and 28, respectively.

It will thus be seen that all of the chambers 26, 27, 28 and 30 are charged with fluid under pressure from the passage 32 and, consequently, that the fluid pressure forces acting on opposite sides of the diaphragms 16, 17, and 18 are balanced, the largest diaphragm 15 alone being subject to the unbalanced force of fluid under pressure acting in chamber 26 on the right hand face thereof. Under these conditions the diaphragm 15 is accordingly flexed individually to effect the operation of the self-lapping valve mechanism while the remaining diaphragms remain stationary. Under these conditions a high brake cylinder pressure is obtained for any given increase in the pressure of fluid in pipe 12.

If the vehicle is empty the slide valve 54 will be in the position in which it is shown in Fig. 1 so that when an application of the brakes is initiated the supply of fluid under pressure to the brake cylinder will be under the control of the smallest flexible diaphragm 18, so that a light brake cylinder pressure is obtained for any given increase in the pressure of fluid in pipe 12. If however the vehicle is lightly loaded the slide valve 54 will be in the position in which it establishes communication from the passage 32a to the passage 104 and diaphragm chamber 28, so that the diaphragm 17 which has a greater face area than the smallest diaphragm 18 acts to control the valve mechanism to provide a higher brake cylinder pressure for any given increase in the pressure of fluid in pipe 12. If the vehicle is more heavily loaded the slide valve will be in the position in which it establishes communication from the passage 32a to the passages 104 and 105 and consequently diaphragm chambers 27 and 28, so that the diaphragm 16 which has a greater face area than the diaphragm 17 acts to control the valve mechanism to provide a still higher brake cylinder pressure for any given increase in the pressure of fluid in pipe 12.

In initiating the release of the brakes after an application effected on a fully loaded, or a partially loaded vehicle, fluid under pressure in the pipe 12 is vented to the atmosphere by the brake controlling valve device 1 as previously described in connection with a release of the brakes after an application on an empty vehicle. In the event of a fully loaded vehicle fluid under pressure in chambers 26, 27, and 28 is vented to the atmosphere past the check valve 35, 35a and 35b, respectively and also by way of passage 106, 105, and 104 respectively, cavity 115 in the slide valve 54, passage 32a, passage 32 and pipe 12. The chamber 30, being directly connected to the passage 32 obviously reduces with the pressure in pipe 12 independently of the check valves 35, 35a and 35b.

When the vehicle is partially loaded the pressure in any of the chambers 27 and 28, which is charged with fluid under pressure, is correspondingly and rapidly reduced according to the reduction in pressure in pipe 12, by flow of fluid past check valve 35a and 35b, respectively and also by way of passage 105 and 104, respectively, cavity 115 in the slide valve 54, passage 32a and passage 32. As before mentioned in connection with release on a fully loaded vehicle the pressure of fluid in chamber 30 reduces independently of the check valves and also independently of the slide valve 54.

With these chambers vented, fluid under pressure in chamber 25 will cause the diaphragm assembly to move to its release position in which it is shown in Fig. 1 of the drawings to cause the exhaust valve of the self-lapping valve mechanism to be unseated thus venting fluid under pressure from the brake cylinder to the atmosphere to effect a release of the brakes.

It will be understood from the foregoing description that in empty vehicle braking for a chosen pressure of fluid supplied to pipe 12 a lighter brake application will be obtained than when the vehicle is either partially or fully loaded. It will also be understood that when the vehicle is fully loaded a heavier brake application will be obtained than when it is partially loaded. All of this is due to the action of the differential diaphragms 15, 16, 17, and 18 and to their selection by the adjusting or change over portion 7 of the variable load control valve device 5 in accordance with the load on the vehicle.

If at any time while the vehicle doors are open, the load on the vehicle is decreased, the body of the vehicle will move upwardly, due to the action of the body supporting springs, relative to the fixed member 52 of the truck. When this occurs the spring 61 in the variable load mechanism 5 acting through the medium of the collar 60 and bar extension 57 moves the bar 47 and consequently the slide valve 54 in a direction toward the left hand to the proper adjusted position in accordance with the reduction in load on the vehicle.

*Description of the embodiment shown in Fig. 2*

In Fig. 2 of the drawings another form of the invention is illustrated in which the control of the supply of fluid under pressure to and the release of fluid under pressure from the relay valve portion is accomplished through the medium of electrical means operative according to variations in the weight of the load carried by the vehicle.

As shown this form of the variable load mechanism comprises a relay valve device 150, a regulating device 151, comprising a valve portion 152 and electric switch portion 153, for controlling the relay valve device and a fluid pressure motor 154 for positioning the regulating device.

It will be understood that this variable load mechanism is employed with the brake controlling valve device 1, the brake cylinder 8, the storage reservoir 9 and the switches 91 associated with the vehicle doors 92, shown in Fig. 1.

As shown the relay valve device 150 comprises a differential diaphragm assemblage identical with that shown in the relay portion 7, of the variable load mechanism 5 associated with Fig. 1, which diaphragm portion is operative in the same manner to control the operation of a supply and release valve mechanism, not shown, but described in connection with the equipment illustrated in Fig. 1. In addition, this relay valve device is provided with a magnet valve casing section 156 containing magnet valve devices 157, 158, and 159 which serve to control the supply of fluid under pressure to and the release of fluid under pressure from the chambers 28, 27, and 26, respectively.

The magnet valve device 157 comprises a pair of oppositely seating valves 160 and 161, which are yieldingly urged by a biasing spring 167 into seated and unseated positions, respectively, and which are actuated against the force of the spring 167 into unseated and seated positions, respectively, by energization of an electromagnet 168. The valve 160 is contained in a chamber 169 which is in constant open communication with passage 32 by way of a passage 170. The valve 161 is contained in a chamber 171 which is constantly open to the atmosphere through an exhaust passage 172.

Located between the chamber 169 and 171 is a chamber 173 which is constantly connected to passage 104 and connected diaphragm chamber 28.

It will thus be seen that when the electromagnet 168 is deenergized, as shown, the valves 160 and 161 are seated and unseated, respectively. With the valves thus positioned the valve 160 cuts off the supply of fluid under pressure from chamber 169 and consequently connected passages 170 and 32 to chamber 173, and the chamber 173 is vented to the atmosphere through passage 172 past the unseated valve 161. When the electromagnet 168 is energized, the valve 161 is seated to prevent exhaust of fluid under pressure from chamber 173 and the valve 160 is unseated to permit fluid under pressure to flow from chamber 169 to chamber 173 and connected passage 104.

The magnet valve device 158 is identical in construction with magnet valve device 157 and comprises a valve 174 and a valve 175, yieldingly urged into seated and unseated positions, respectively, by a biasing spring 176 and actuated against the force of the spring 176 into unseated and seated positions, respectively, by energization of an electromagnet 177. The valve 174 is contained in a chamber 178 constantly connected to passage 32 by way of passage 170, and the valve 175 is contained in a chamber 179 which is constantly open to the atmosphere through the exhaust passage 172.

Located between the chambers 178 and 179 is a chamber 180 which is constantly connected to the diaphragm chamber 27 by way of passage 105.

When the electromagnet 177 is deenergized the valve 174 is seated to close off the supply of fluid under pressure from the chamber 178 to the chamber 180 and the valve 175 is unseated to release fluid under pressure from chamber 180 to chamber 179. When the electromagnet 177 is energized, the valve 175 is seated to close off the flow of fluid under pressure from the chamber 180 to the chamber 179 and the valve 174 is unseated to permit fluid under pressure to be supplied from chamber 178 to the chamber 180.

The magnet valve device 159 is identical in construction with the magnet 158 and comprises a valve 184 and a valve 185, yieldingly urged into seated and unseated positions, respectively, by a biasing spring 186 and actuated against the force of spring 186 into unseated and seated positions, respectively, by energization of an electro-magnet 187. The valve 184 is contained in a chamber 188 constantly connected to passage 170, and the valve 185 is contained in a chamber 189 which is constantly open to the atmosphere by way of exhaust passage 172.

Located between the chambers 188 and 189 is a chamber 190 which is constantly connected to the diaphragm chamber 26 by way of passage 106.

When the electromagnet 187 is deenergized the valve 184 is seated to close off the supply of fluid under pressure from chamber 188 to the chamber 190 and the valve 185 is unseated to release of fluid under pressure from chamber 190 to chamber 189. When the electro-magnet 187 is energized, the valve 185 is seated to prevent the flow of fluid under pressure from the chamber 190 to the chamber 189 and the valve 184 is unseated to permit fluid under pressure to flow from chamber 188 to the chamber 190.

The magnet valve casing section 156 of the relay valve device 150 is arranged to carry a fluid pressure responsive switch device 191 which as shown may comprise a casing containing a piston 192 having a stem 193 on which is carried, in insulated relation, a contact bridging member 194 for connecting, in circuit-closing relation, a pair of fixed contact members 195, one of which is connected to the positive terminal of a storage battery 13 by means of a conductor 196 and the other of which is connected to a conductor 197 leading to a contact finger or member 198 contained in the adjusting portion 153 of the variable load mechanism. At one side of the piston 192 is a spring 198 which yieldingly urges the piston downwardly into engagement with the end cover of the casing, in which position the contact-bridging member 194 is out of contact with the contact members 195 so as to maintain open the battery circuit through the contact member 198. At the opposite side of the piston 192 is a chamber 199 which is constantly connected to the passage 170 by way of a branch passage 200.

Whenever the pressure of fluid supplied to chamber 199 and acting on the piston 192 is sufficient to overcome the spring 198, the piston 192 and thereby the contact bridging member 194 are shifted upwardly. The contact bridging member 194 engaging the contact members 195.

The regulating device 151 which is provided for selectively energizing or deenergizing the magnet valve devices 157, 158, and 159 is operated, according to the load on the vehicle, to its several selecting positions. This device as hereinbefore mentioned may comprise a valve portion 152 and a switch portion 153.

The valve portion 152 as shown comprises a casing containing a piston 201 having a stem 202. At one side of piston 201 is a valve chamber 203 containing a slide valve 204 which is arranged to be operated by the stem 202. At the opposite side of the piston is a chamber 205 which is in constant open communication with passages 206 and 207. Contained in chamber 205 is a spring 208 which, at all times, tends to urge the piston 201, piston stem 202, and slide valve 204 downwardly to the position in which they are shown in the drawings.

Leading from the seat for the slide valve 204 are passages 209 and 210, the passage 209 being open to the atmosphere and the passage 210 being open to a pipe 211 connected to the piston chamber 266 of the fluid pressure motor 154.

For the purpose of controlling the operation of the piston 201 and consequently the slide valve 204 a magnet valve device 215 is provided, which magnet valve device is carried by the casing of the valve portion 152. This magnet valve device comprises a pair of oppositely seating valves, 216 and 217, contained in a chamber 218 which is connected to the passage 206. These valves are yieldingly urged by a spring 219 into seated and unseated positions, respectively, and are arranged to be actuated against the force of the spring 219 into unseated and seated positions, respectively, upon energization of an electro-magnet 220. With the valve 217 unseated as shown, communication is established from the supply reservoir 4 to the passage 206, by way of pipe 78, a chamber 221 in the magnet valve device, past unseated valve 217 and chamber 218, the valve 217 when seated closing this communication. With the valve 216 unseated, communication is established from chamber 218 connected to passage 206, to an atmospheric passage 222, the valve 216 when seated closing this communication.

The electric circuit for controlling the operation of the electro-magnet 220 is controlled by operation of the vehicle doors. One end of the coil or winding of this electro-magnet is connected to the positive terminal of the storage battery 13 by means of conductor 93 the other end of the coil or winding is connected to the conductor 95 which leads to the door switches 91, which switches in turn are connected to the negative terminal of the storage battery 13, by means of conductors in the same manner as shown and described in connection with the equipment shown in Fig. 1 of the drawings.

The electric switch portion 153 of the regulating device 151 comprises a casing containing a bell crank lever 225 which is provided with arms 226 and 227 and is pivotally connected to the casing by means of a pin 228. The arm 226 is arranged to carry at the outer end thereof a roller 229 for a purpose hereinafter described. The arm 227 is connected to one end of a link 230, which link at its opposite end is connected to a longitudinally movable ratchet bar 231.

The ratchet bar 231 is slidably mounted in the casing for longitudinal movement and is provided with teeth 232 which are arranged to be engaged by the teeth of a pawl 233. This pawl is connected to a piston 234, subject on one side to the pressure of a spring 235 and subject on the opposite side to the pressure of fluid in a piston chamber 236, which is connected to the passage 207 leading to the chamber 205 in the valve portion 152 of the adjusting device.

The bell crank arm 227 is provided with an extension in the form of a contact arm 237 which is arranged to selectively connect the contact finger or member 198 in circuit-closing relation with a plurality of contact fingers 238, 239 and 240. The contact fingers 238, 239, and 240 are connected by conductors 241, 242, and 243, respectively, to one terminal of the electromagnet windings 168, 177, and 187 of the magnet valves 157, 158, and 159, respectively. The opposite terminals of the electro-magnet windings 168, 177, and 187 are connected to ground as shown.

Contained in the casing and interposed between and operatively engaging one side of the arm 227 and the casing is a spring 244 which tends, at all times, to move the arm 227 and consequently the contact arm 237 to the position in which they are shown in Fig. 2 of the drawings.

The roller 229, hereinbefore mentioned, carried at the outer end of the arm 226 engages a cam surface 245 provided on a longitudinally moveable bar 246, which bar is a suitable guide in the casing by means of rollers 247 and 248. This bar is provided with an integral extension 251 which extends through chamber 249 to the exterior of the casing. The extension is slidably guided and supported at its outer end by the casing.

Contained in the chamber 249 and interposed between and operatively engaging a spring seat 250 and the casing is a spring 252 which tends, at all times, to urge the bar 246 in a direction toward the left hand into the position in which it is shown in Fig. 2 of the drawings. The spring seat 250 encircles the extension 251 and is at all times maintained in abutting relationship with the shoulder formed on the bar 246.

The outer end of the extension 251 is pivotally connected to one end of a lever 253 by mean of a pin 254, which lever intermediate its ends is pivotally connected by means of a pin 255 to a bracket 256 carried by the casing of the switch portion 153. The other end of the lever 253 is connected by means of a pin 256 with one end of a rod 257, which rod, at its opposite end is connected to a longitudinal movable rack bar 258.

The bar 258 is slidably mounted in lugs 259, carried by the casing, for longitudinal movement and is provided with teeth 260 which are arranged to mesh with corresponding teeth on a gear wheel 261 which is also carried on the casing by means of a pin 262. The gear wheel 261 is adapted to be driven by a vertically movable rack bar 263 which is slidably mounted in a lug 264 carried by the casing, the bar being provided with teeth which mesh with the teeth of the gear wheel.

The fluid pressure motor 154 for positioning the regulating portion 151 is mounted on a relatively fixed part of the vehicle truck. This motor, as shown, may comprise a cylinder casing containing a piston 265 having a stem or push rod 273 which extends to the exterior of the casing.

At one side of the piston 265 is a chamber 266 which as hereinbefore mentioned, is in constant open communication with the pipe 211. At the opposite side of the piston is a chamber 267 which is connected to the atmosphere by way of a passage 268.

The stem or push rod 273 extends through a bore 269 in a fixed part 270 of the truck. Beyond the part 270 the outer end of the stem is adapted to engage the lower end of the bar 263 carried by the adjusting valve device 151 located on the car body. The stem 273 is provided adjacent the outer wall of the cylinder casing with a spring seat 271. Interposed between and operatively engaging the spring seat and the fixed part 270 of the truck is a spring 272 which tends, at all times, to urge the piston 265 and attached stem or push rod 273 to the position in which they are shown in Fig. 2 of the drawings.

*Operation of the equipment shown in Fig. 2*

In describing the operation of the embodiment of the invention shown in Fig. 2 it will first be assumed that the vehicle doors are closed, the vehicle is empty, the brakes released and the system being charged with fluid under pressure in the manner hereinbefore described in connection with the equipment shown in Fig. 1.

Under these conditions fluid under pressure flows from pipe 78 to chamber 221 in the magnet valve device 215 from whence it flows by way of a passage 275 to chamber 203 at one side of piston 201. Since the electro-magnet 220 is deenergized the valves 216 and 217 will be positioned as shown, thus fluid under pressure in chamber 221 flows past unseated valve 217 to chambers 218 from whence it flows to chamber 205 at the opposite side of the piston 201 by way of passage 206. The fluid pressure acting on opposite side of piston 201 will thus be equal so that the spring 208 acts to maintain said piston and slide valve 204 in the position shown.

With the slide valve 204 thus positioned the chamber 266 in the fluid pressure motor 154 is connected to the atmosphere, by way of pipe 211, passage 210, a cavity 276 in the slide valve 204 and passage 209. With the chamber 266 thus vented to the atmosphere, the spring 272 acts to maintain the piston and push rod 273 in its extreme lower position as shown in Fig. 2. With the piston and push rod in this position, the outer end of the push rod will be maintained out of engagement with the end of the bar 263, so that the usual relative vertical movement between the truck and the vehicle body, while the vehicle is in motion, will have no effect upon the bar 263 and consequently the gear 261, thus preventing the transmission of damaging forces to the gear 261 and associated parts.

Under these conditions the spring 252 acting through the spring seat 250 maintains the bar 246 in its extreme left hand position as shown. With the bar 246 thus positioned the roller 229 carried by the arm 226 of the bell crank lever 225 is in engagement with the right hand or highest end of the inclined surface of the cam 245, thus permitting spring 244 acting on the arm 227 to maintain the bell crank lever 225 in the position in which it is shown. With the bell crank lever 225 thus positioned, the contact arm 237 is maintained out of engagement with the contact fingers 238, 239, and 240, thus the electro-magnets 168, 177, and 187 of the magnet valves 157, 158, and 159, respectively, will be maintained deenergized. Since the bell crank lever is maintained in the position shown the attached rachet bar 231 will be in its extreme left hand position as shown.

When initially charging the equipment, fluid under pressure will be supplied to chamber 205 of the valve portion 152 of the regulating valve device 151 from whence it will flow by way of passage 207 to piston chamber 236. Fluid under pressure supplied to chamber 236 causes the piston 234 to move downwardly against the opposing pressure of the spring 235 causing the teeth of the pawl 233 to engage with the teeth 232 of the bar 231, thereby locking the ratchet bar 231 and bell crank lever 225 in the position shown.

*Application of the brakes on an empty vehicle*

When an application of the brakes is effected in the manner hereinbefore described in connection with Fig. 1, fluid under pressure is supplied to the diaphragm chamber 30 of the relay valve device 150 by way of pipe 12 and passage 32. Fluid under pressure supplied to chamber 30 causes the diaphragm assemblage to function to actuate the valve mechanism to supply fluid under pressure to the chamber 25 and connected pipe 103 leading to the brake cylinder.

From the foregoing it will be seen that if the vehicle is empty and an application of the brakes is effected to the supply of fluid under pressure to the brake cylinder will be under the control of the smallest flexible diaphragm 18, so that a light brake cylinder pressure is obtained for any given increase in the pressure of fluid in pipe 12 in the same manner as described in connection with the operation of the embodiment shown in Fig. 1 of the drawings.

Since a release of the brakes following an application on an empty vehicle equipped with the variable load mechanism shown in Fig. 1 is accomplished in substantially the same manner as hereinbefore described in connection with the operation of the equipment shown in Fig. 1 it is deemed unnecessary to repeat the description of this operation here.

When the vehicle is brought to a stop and one or more of the vehicle doors are opened the circuit of the electromagnet 220 will be closed by the switches 91 associated with the doors 92 as shown in dotted lines in Fig. 1. The energization of magnet 220 seats valve 217 and unseats valve 216. With the valve 216 unseated fluid under pressure in chamber 205 and passage 207 connected to the piston chamber 236 will be vented to the atmosphere by way of passage 206, chamber 180 in the magnet valve device 215, past unseated valve 216 and through atmospheric exhaust passage 22. The reduction of fluid pressure in chamber 236 due to such venting, permits the spring 235 to force the piston 234 upwardly drawing the teeth of the pawl 233 out of locking engagement with the teeth 232 of the ratchet bar 231.

The reduction of fluid pressure in chamber 205 permits the higher pressure acting in chamber 203 to move the piston 201 upwardly against the opposing pressure of the spring 208 until the piston engages a sealing gasket 278. When the piston 201 has been thus moved to its upper position the slide valve 204 will have been moved to a position in which the passage 210 is connected to chamber 203. With passage 210 connected to chamber 203 fluid under pressure in supply reservoir 4 flows to the chamber 266 in the fluid pressure motor 154, by way of pipe 78, chamber 221 in the magnet valve device 215, passage 275, chamber 203 in the valve portion 152 of the regulating valve device 151, passage 210 and pipe 211.

Fluid under pressure supplied to chamber 266 causes the piston 265 and attached push rod 273 to move upwardly against the opposing pressure of spring 272. The push rod as it thus moves engages the end of the bar 263. It will here be understood that since the vehicle is empty the piston 265 will have made its full traverse at the time the push rod engages with the bar 263 so that even though the locking pawl 233 is in its unlocked position, the bell crank lever and operating bar 246 will not be caused to move from their empty position in which they are shown.

Now as the vehicle is loaded the vehicle body will move downwardly, due to the compression of the body supporting springs by the increasing load, relative to the push rod 273. The bar 263, since it is carried by the vehicle body and is in operative engagement with end of the push rod 273 of the fluid pressure motor 154 located on the truck, is caused to move upwardly in response to the downward movement of the vehicle body. The bar 263 as it thus moves causes the gear 261 to rotate in a counter-clockwise direction. The gear 261 as it is thus rotated causes the bar 258 to move longitudinally in the direction toward the left hand, the bar as it moves pulling the rod 257 in the same direction. Movement of the rod 257 in a direction toward the left hand causes the lever 253 to rock in a clockwise direction about the pivot pin 255.

The lever 253 as it is thus rocked causes the extension 251 and consequently the bar 246 to move in a direction toward the right hand against the opposing pressure of the spring 252. As the bar 246 is moved in this direction, the cam surface 245 thereof which engages the roller 229 causes the bell crank lever 225 to rock in a clockwise direction about the pivot pin 228 against the opposing pressure of the spring 244. This clockwise rotary motion of the bell crank lever 225 will continue as long as the load on the vehicle is being increased.

The bell crank lever 225, as it rocks in response to the increasing load on the vehicle, pulls the ratchet bar 231 longitudinally and at the same time moves the contact bar 237 clockwise to one or other of its three load positions depending upon the degree of increase of the load.

When the vehicle has been loaded, the vehicle doors are closed, the doors as they move from their open position, opening the circuit through the electro-magnet 220 as before described, thus effecting the deenergization of electro-magnet 220. With the electro-magnet 220 deenergized, the spring 219 acts to unseat the valve 217 and seat the valve 216. With the valve 217 unseated fluid under pressure from the supply reservoir 4 is again supplied to the chamber 205 and 236 through the circuit hereinbefore traced. When the pressure of fluid in chamber 236 has been increased to a degree sufficient to overcome the opposing pressure of the spring 235, the piston is moved downwardly causing the teeth of the pawl 233 to engage the teeth of the ratchet bar 231, thus locking the ratchet bar and attached bell crank lever 225 and consequently the contact bar 237 in the proper adjusted position.

When the combined pressure of fluid in chamber 205 and spring 208 acting on piston 201 has been increased to a degree sufficient to overcome the opposing pressure acting in chamber 203 the piston 201 and attached slide valve 204 will be moved to the position in which they are shown. With the slide valve thus positioned the fluid pressure in chamber 266 of the fluid pressure motor 154 will be vented to the atmosphere through the circuit previously described. The reduction of the pressure of fluid in chamber 266 due to such venting permits the spring 272 to force the piston 265 and attached push rod 273 to its extreme downward position, so that the end of the push rod 273 is moved out of engagement with the bar 263, for the purpose hereinbefore described.

As above mentioned the contact bar 237 will be positioned according to the load on the vehicle. If the vehicle is fully loaded the contact bar 237 will assume its full load position in which it will connect the contact member 158 to the contact fingers 238, 239, and 240. If the vehicle is only lightly loaded the contact bar will be positioned so that it connects the contact member 158 to the contact fingers 238 only, and if the vehicle is more heavily loaded, but not fully loaded, the contact bar will connect the contact member 198 to the contact fingers 238 and 239 the contact fingers 240 remaining disconnected from the contact member 158.

When it is desired to effect an application of the brakes, fluid under pressure is supplied through pipe 12 and passage 32 to chamber 30 of the relay valve device 150 as hereinbefore described in connection with an application of the brakes on an empty vehicle. Fluid under pressure supplied to passage 32 flows by way of passage 170 to chambers 169, 178, and 188 of the magnet valves 157, 158, and 159, respectively. Fluid under pressure in passage 170 also flows by way of connected passage 200 to chamber 199 of the fluid pressure operated switch device 191, where at a low pressure piston 192 is actuated upwardly, against the bias of spring 198, to close contacts 195. With these contacts closed the positive terminal of battery 13 is connected by way of conductor 196, contacts 195, bridging member 194 and conductor 197 to contact member 198.

As above described the contact bar 237 will be positioned according to the load on the vehicle, thus if the vehicle is fully loaded the contact bar will connect contact member 198 to contact fingers 238, 239, and 240. Under these conditions the electro-magnets 168, 177, and 187 of the magnet valves devices 157, 158, and 159, respectively, will be energized. The circuit to the magnet 157 including contact member 198, contact bar 237, contact finger 238 conduit 241, through the coil or winding of the electro-magnet 168 to a ground connection 280. The circuit to the magnet 158 including contact member 198, contact bar 237, contact finger 239, conduit 242, through the coil or winding of the electro-magnet 177 to the ground connection 280. The circuit to the magnet 159 including contact member 198, contact bar 237, contact finger 239, conduit 243, through the coil or winding of the electro-magnet 187 and a ground connection 281.

With the electro-magnets 168, 177, and 187 energized, the valves 160, 174, and 184 of the magnet valve devices 157, 158, and 159, respectively, will be actuated to their unseated position. With these valves thus positioned communication is opened between passage 32 and each of the diaphragm chambers 28, 27 and 26 in the relay valve device 150.

From passage 32 fluid under pressure flows to passage 170 and from this passage it now flows to diaphragm chambers 28, 27, and 26, the flow to the chamber 28 being by way of chamber 169 in magnet valve 157, past unseated valve 160, chamber 173 and passage 104; the flow to chamber 27 being by way of chamber 178 in magnet valve 158, past unseated valve 174, chamber 180 and passage 105; the flow to chamber 26 being by way of chamber 188 in magnet valve 159, past unseated valve 184, chamber 190, and passage 106.

It will thus be seen that all of the chambers 26, 27, 28, and 30 of the relay valve device 150 are charged with fluid under pressure from the passage 32 and, consequently the relay valve device will operate to effect a heavy application of the brakes in the same manner as previously described in connection with the equipment shown in Fig. 1 when the vehicle is fully loaded.

If the vehicle is empty the contact bar 237 of the switch portion 153 will be in the position in which it is shown in Fig. 2 so that the electromagnets 168, 177, and 187 will be maintained de-energized, thus when an application of the brakes is initiated the supply of fluid under pressure to the brake cylinder will be under control of the smallest flexible diaphragm 18, thereby effecting a light brake cylinder pressure for any given increase in the pressure of fluid in pipe 12. If the vehicle is lightly loaded the contact bar 237 will be in the position in which it establishes contact between contact member 198 and contact finger 238, so that the electro-magnet 168 of magnet valve device 157 will be energized. With this magnet energized the valve 160 therein will be unseated, thus establishing communication from the passage 32 to the passage 104 and consequently diaphragm chamber 28 through a circuit previously traced, so that the diaphragm 17 which has a greater face area than the smallest diaphragm 18 act to control the valve mechanism to provide a higher brake cylinder pressure for a given increase in the pressure of fluid in pipe 12. If however, the vehicle is more heavily loaded the contact bar 237 will be in the position to establish contact between contact member 198 and the contact fingers 238 and 239, so that the electromagnets 168 and 177 of magnet valve device 157 and 158, respectively, will be energized. With these electro-magnets energized the valves 160 and 174 will be unseated, thus establishing communication from the passage 32 to the passages 104 and 105 and consequently to the chambers 27 and 28, so that the diaphragm 16 which has a greater face area than the diaphragm 17 acts to control the valve mechanism to provide a still higher brake cylinder pressure for any given increase in pressure of fluid in pipe 12.

In initiating the release of the brakes after an application effected on a fully loaded or a partially loaded vehicle, fluid under pressure in the pipe 12 is vented to the atmosphere as hereinbefore described. In the event of a fully loaded vehicle fluid under pressure in chambers 26, 27, and 28, is vented to the passage 32 and connected pipe 12 past the check valve 35, 35a and 35b, respectively. From chambers 26, 27, and 28 fluid under pressure also flows to passage 32 by way of the magnet valve device 157, 158, and 159. The flow from chamber 26 being by way of passage 106 and magnet valve device 159; the flow from chamber 27 being by way of passage 105 and magnet valve device 158; the flow from chamber 28 being by way of passage 104 and magnet valve device 157. The chamber 36, being directly connected to the passage 32 obviously reduces with the pressure in pipe 12 independently of the check valves and independently of the magnet valve devices.

When the vehicle is partially loaded the pressure in any of the chambers 27 and 28 which is charged with fluid under pressure is correspondingly released according to the reduction in pressure in pipe 12, by flow of fluid past the check valves 35a and 35b, respectively, and also by way of passages 105 and 104 and the magnet valves devices 158 and 157, respectively.

As before described, with these chambers vented, the relay valve device will operate to effect a release of the brakes.

*Embodiment shown in Fig. 3*

In Fig. 3 of the drawings another form of the invention is illustrated in which the control of the supply of fluid under pressure to and the release of fluid under pressure from the relay valve device is accomplished through the medium of a slide valve operative according to variations in the weight of the load carried by the vehicle.

In this figure, the relay valve device illustrated in Fig. 2 has been modified by omitting the magnet valve casing 156 and thereby the control magnets 157, 158, and 159 and a cover plate 300 is substituted therefore. The regulating valve device differs from the corresponding device of the equipment shown in Fig. 2 in that the electrical contacts for controlling the magnet valve devices 157, 158, and 159 are omitted and a slide valve 301 substituted therefor. The slide valve 301 is operated by a ratchet bar 302 which bar is in some respects similar to the ratchet bar 231 shown in Fig. 2 of the drawings.

It will be understood that the fluid pressure motor 154 and associated parts used for positioning the regulating valve device although not shown in Fig. 3, will be identical with those shown in Fig. 2.

In this embodiment of the invention the passages 104, 105, and 106 leading to diaphragm chambers 28, 27, and 26, respectively, in the relay valve device are connected to pipes and passages 304, 305, 306, respectively, which lead to the seat for the slide valve 301.

The slide valve 301 is contained in a chamber 310 which is in constant open communication with the passage 32 by way of a passage 308. This slide valve is operatively connected by means of a pin 311 to the ratchet bar 302, which bar is connected to one end of the link 230 which at its opposite end is connected to the arm 227 of the bell crank lever 225.

From the foregoing description of the operation of the variable load mechanism illustrated in Fig. 2 it will be understood that the regulating valve device illustrated in Fig. 3 is in its empty vehicle position. It will also be understood that when the vehicle doors are opened and the vehicle is being loaded the bell crank lever 225 is rocked in a clockwise direction about the pin 228, causing the ratchet bar 302 and consequently the slide valve 301 to move in a direction toward the right hand, and that this movement of the ratchet bar and slide valve will continue as long as the load on the vehicle is being increased until the vehicle is fully loaded. With this in mind it will be obvious that the slide valve 301 will be positional according to the load on the vehicle.

If the vehicle is empty the slide valve 301 will be in the position in which it is shown in Fig. 3, in which passage 32 is connected to the diaphragm chamber 30 only. If the vehicle is fully loaded the slide valve 301 will be moved to a position in which it uncovers the passages 304 305, and 306 thereby connecting them to the chamber 310 and consequently to passage 32. If the vehicle is only lightly loaded the slide valve will be positioned to uncover only passage 304, and if the vehicle is more heavily loaded, but not fully loaded, the slide valve will be positioned to uncover passages 304 and 305.

When it is desired to effect an application of the brakes, fluid under pressure is supplied to pipe 12 and passage 32 in the usual manner, and if the vehicle is empty, fluid under pressure in passage 32 flows only to chamber 30, thus the supply of fluid under pressure to the brake cylinder will be under control of the smallest diaphragm 18; and if the vehicle is lightly loaded, fluid under pressure in passage 32 flows to chamber 30 and also to chamber 28 being by way of passage 308, chamber 310, passage and pipe 304 and passage 104, so that the supply of fluid under pressure to the brake cylinder will be under control of the diaphragm 17. If the vehicle is more heavily loaded, but not fully loaded, fluid under pressure in passage 32 flows to chamber 30 and in addition to chamber 28 and 27, the flow of fluid under pressure to chamber 27 being by way of passage 308, chamber 310, passage and pipe 305 and passage 105, so that the supply of fluid under pressure to the brake cylinder will be under control of the diaphragm 16. If however the vehicle is fully loaded fluid under pressure in passage 32 flows to all of the diaphragm chambers 30, 28, 27, and 26, the flow to chamber 26 being by way of passage 308, chamber 310, passage and pipe 306 and passage 106, so that the supply of fluid under pressure to the brake cylinder will be under control of the diaphragm 15.

In initiating a release of the brakes after an application effected on a fully loaded vehicle or partially loaded vehicle, fluid under pressure in pipe 12 and connected passage 32 is vented to the atmosphere as previously described. In the event of a fully loaded vehicle fluid under pressure in chambers 26, 27, and 28, is vented to atmosphere past the check valves 35, 35a and 35b, respectively, and also by way of passages 106, 105, and 104 respectively, chamber 310, passage 308, passage 32 and pipe 12. The chamber 30, being directly connected to passage 32 thus reduces with the pressure in pipe 12 independently of the check valves 35, 35a and 35b.

When the vehicle is partially loaded the pressure in any of the chambers 27 and 26, which are charged with fluid under pressure, is correspondingly reduced according to the reduction in pressure in pipe 12, by flow of fluid past check valves 35a and 35b, respectively, chamber 310, passage 308, passage 32 and pipe 12. As before mentioned in connection with release on a fully loaded vehicle the pressure of fluid in chamber 30 reduces independently of the check valves and also independently of the slide valve 301. If the release is initiated following an application on an empty vehicle the pressure of fluid in chamber 30 as just described reduces directly with the pressure in passage 32.

Having now described my invention, what I claim as new and desire to secure by Letters Patent, is:

1. In a variable load brake equipment for vehicles, in combination, a brake cylinder, brake control means operatively responsive to the pressure of fluid supplied thereto for controlling the degree of pressure in said brake cylinder, valve means having a plurality of different control positions and effective, dependent upon its position, to condition the brake control means differently so as to establish different fluid pressures in the brake cylinder for the same pressure of fluid supplied to the brake control means, regulating means controlled according to the load on the vehicle for positioning said valve means in its appropriate control position, a door for the vehicle, and means operative upon the opening of said door for controlling the operation of said regulating means.

2. In a variable load brake equipment for vehicles, in combination, a brake cylinder, brake control means operatively responsive to the pressure of fluid supplied thereto for controlling the degree of pressure in said brake cylinder, valve means having a plurality of different control positions and effective, dependent upon its position, to condition the brake control means differently so as to establish different fluid pressures in the brake cylinder for the same pressure of fluid supplied to the brake control means, regulating means controlled according to the load on the vehicle for positioning said valve means in its appropriate control position, locking means for locking the regulating means in its adjusted position, a door for the vehicle, and means controlled by the operation of said door for controlling the operation of the locking means.

3. In a variable load brake equipment for vehicles, in combination a brake cylinder, brake control means operatively responsive to the pressure of fluid supplied thereto for controlling the degree of pressure in said brake cylinder, valve means having a plurality of different control positions and effective, dependent upon its position, to condition the brake control means differently so as to establish different fluid pressures in the brake cylinder for the same pressure of fluid supplied to the brake control means, regulating means controlled according to the load on the vehicle for positioning said valve means in its appropriate control position, a door for the vehicle, electro-responsive means operative upon the closing of said door for maintaining said regulating means in its adjusted position.

4. In a variable load brake equipment for vehicles, in combination, a brake cylinder, brake control means operatively responsive to the pressure of fluid supplied thereto for controlling the degree of pressure in said brake cylinder, a slide valve effective, dependent upon its position, to condition the brake control means differently so as to establish different fluid pressures in the brake cylinder for the same pressure of fluid supplied to the brake control means, lever means for positioning said slide valve, a door for the vehicle, and means operative according to the load on the vehicle when the door is open for actuating the lever means.

5. In a variable load brake equipment for vehicles, in combination, a brake cylinder, brake control means operatively responsive to the pressure of fluid supplied thereto for controlling the degree of pressure in said brake cylinder, a slide valve effective, dependent upon its position, to condition the brake control means differently so as to establish different fluid pressures in the brake cylinder for the same pressure of fluid supplied to the brake control means, a door for the vehicle, and means operative upon the opening of said door and according to the load on the vehicle for positioning said slide valve.

6. In a variable load brake equipment for vehicles, in combination, a brake cylinder, brake control means operatively responsive to the pressure of fluid supplied thereto for controlling the degree of pressure in said brake cylinder, a slide valve effective, dependent upon its position, to condition the brake control means differently so as to establish different fluid pressures in the brake cylinder for the same pressure of fluid supplied to the brake control means, a door for the vehicle, and means operative according to the load on the vehicle when the door is open for positioning said slide valve and operative upon the closing of said door for causing said slide valve to be locked in its adjusted position.

7. In a variable load brake equipment for vehicles, in combination, a brake cylinder, brake control means operatively responsive to the pressure of fluid supplied thereto for controlling the degree of pressure in said brake cylinder, a slide valve effective, dependent upon its position, to condition the brake control means differently so as to establish different fluid pressures in the brake cylinder for the same pressure of fluid supplied to the brake control means, a door for the vehicle, means operative according to the load on the vehicle when said door is open for positioning said slide valve, a mechanism for locking said means in its adjusted position, said mechanism being operative upon the closing of said door for locking said means in its adjusted position and operative upon the opening of said door for unlocking said means.

8. In a variable load brake equipment for vehicles, in combination, a brake cylinder, brake control means operatively responsive to the pressure of fluid supplied thereto for controlling the degree of pressure in said brake cylinder, electrical contact means effective, dependent upon its position, to condition the brake control means differently so as to establish different fluid pressures in the brake cylinder for the same pressure of fluids supplied to the brake control means, lever means for positioning said contact means, a door for the vehicle, and means operative according to the load on the vehicle when the door is open for actuating the lever means.

9. In a variable load brake equipment for vehicles, in combination, a brake cylinder, brake control means operatively responsive to the pressure of fluid supplied thereto for controlling the degree of pressure in said brake cylinder, electrical contact means effective, dependent upon its position, to condition the brake control means differently so as to establish different fluid pressures in the brake cylinder for the same pressure of fluid supplied to the brake control means, means for actuating said contact means, a door for the vehicle, and means operative according to the load on the vehicle when the door is open for adjusting the actuating means, and means operative upon the closing of said door for maintaining said actuating means in its adjusted position.

10. In a variable load brake equipment for vehicles, in combination, a brake cylinder, a control pipe, brake control means operatively responsive to the pressure of fluid supplied to said control pipe for controlling the degree of pressure in said brake cylinder, said brake control means having a plurality of electroresponsive means effective, dependent upon which of the electroresponsive means are energized or deenergized to condition it differently so as to establish different fluid pressures in the brake cylinder for the same pressure of fluid supplied to said control pipe, contact means for controlling the energization and deenergization of said electroresponsive means, a door for the vehicle, and regulating means operative upon the opening of said door and according to the load on the vehicle for positioning said contact means.

11. In a variable load brake equipment for vehicles, in combination, a brake cylinder, a control pipe, brake control means operatively responsive to the pressure of fluid supplied to said control pipe for controlling the degree of pressure in said brake cylinder, said brake control means having a plurality of electroresponsive means effective, dependent upon which of the electroresponsive means are energized or deenergized to condition it differently so as to establish different fluid pressures in the brake cylinder for the same pressure of fluid supplied to said control pipe, contact means for controlling the energization and deenergization of said electroresponsive means, a door for the vehicle, means operative according to the load on the vehicle when said door is open for positioning said contact means, a mechanism for locking said means in its adjusted position, said mechanism being operative upon the closing of said door for locking said means in its adjusted position and operative upon the opening of said door for unlocking said means.

12. In a variable load brake equipment for vehicle, in combination, a brake cylinder, a control pipe, brake control means operatively responsive to the pressure of fluid supplied to said control pipe for controlling the degree of pressure in said brake cylinder, said brake control means having a plurality of electroresponsive means effective, dependent upon which of the electroresponsive means are energized or deenergized to condition it differently so as to establish different fluid pressures in the brake cylinder for the same pressure of fluid supplied to said control pipe, regulating means controlled according to the load on the vehicle for controlling the energization and deenergization of said electroresponsive means, a door for the vehicle, another electroresponsive means operative upon the closing of said door for maintaining said regulating means in its adjusted position.

13. In a variable load brake equipment for vehicles, in combination, a control pipe, means for supplying fluid under pressure to said control pipe, a brake cylinder, brake control means operatively responsive to the pressure of fluid supplied to said control pipe for controlling the degree of pressure in said brake cylinder, valve means having a plurality of different control positions for controlling the brake control means to cause it to establish different degrees of pressure in the brake cylinder for the same pressure of fluid supplied to said control pipe, means controlled according to the load on the vehicle for positioning said valve means in one of its different control positions for correspondingly different loads on the vehicle, a locking mechanism for locking said means in its adjusted position, a device operative periodically to perform a necessary function on the vehicle, and means controlled by the operation of said device for controlling the operation of the locking mechanism.

14. In a variable load brake equipment for vehicles, in combination, a brake pipe, a control pipe, a control valve device for supplying fluid under pressure to said control pipe in accordance with a reduction in pressure in said brake pipe, a brake cylinder, a relay valve device responsive to the pressure of fluid supplied to said control pipe for controlling the degree of pressure in said brake cylinder, valve means having a plurality of different control positions and effective, dependent upon its position, to condition the relay valve device differently so as to establish different fluid pressures in the brake cylinder for the same pressure of fluid supplied to the control pipe, regulating means controlled according to the load on the vehicle for positioning said valve means, in its appropriate control position, electroresponsive means operative when energized for rendering said regulating means operative and operative when deenergized for rendering said regulating means inoperative, and a door for the vehicle said door being operative when open to effect energization of said electroresponsive means and operative when closed to effect deenergization of said electroresponsive means.

15. In a variable load brake equipment for vehicles, in combination, a brake cylinder, brake control means having a plurality of chambers and operative according to which chamber or chambers are charged with fluid to the same pressure for effecting corresponding different degrees of pressure in the brake cylinder, means controlled according to the load on the vehicle for selectively determining which chamber or chambers will be charged with fluid under pressure when initiating an application of the brakes, a door for the vehicle, and electroresponsive means operative upon the opening of said door for effecting operation of said means.

16. In a variable load brake equipment for vehicles, in combination, a brake cylinder, brake control means having a plurality of chambers and operative according to which chamber or chambers are charged with fluid to the same pressure for effecting corresponding different degrees of pressure in the brake cylinder, valve means for selectively determining which chamber or chambers will be charged with fluid under pressure when initiating an application of the brakes, a door for the vehicle, and means operative according to the load on the vehicle when the door is open for positioning said valve means.

17. In a variable load brake equipment for vehicles, in combination, a brake cylinder, brake control means having a plurality of chambers and operative according to which chamber or chambers are charged with fluid to the same pressure for effecting corresponding different degrees of pressure in the brake cylinder, valve means for selectively determining which chamber or chambers will be charged with fluid under pressure when initiating an application of the brakes, a door for the vehicle, and means operative according to the load on the vehicle when the door is open for adjusting said valve means and operative upon the closing of said door for causing said valve means to be locked in its adjusted position.

18. In a variable load brake equipment for vehicles, in combination, a brake cylinder, brake control means having a plurality of chambers and operative according to which chamber or chambers are charged with fluid to the same pressure for effecting corresponding different degrees of pressure in the brake cylinder, a plurality of electroresponsive means effective, dependent upon which of the electroresponsive means are energized or deenergized to determine which chamber or chambers will be charged with fluid under pressure when initiating an application of the brakes, and means controlled according to the load on the vehicle for controlling the energization and deenergization of said electroresponsive means.

19. In a variable load brake equipment for vehicles, in combination, a brake cylinder, brake control means having a plurality of chambers and operative according to which chamber or chambers are charged with fluid to the same pressure for effecting corresponding different degrees of pressure in the brake cylinder, a plurality of electroresponsive means effective, dependent upon which of the electroresponsive means are energized or deenergized to determine which chamber or chambers will be charged with fluid under pressure when initiating an application of the brakes, contact means for controlling the energization and deenergization of said electroresponsive means, a door for the vehicle, and regulating means operative upon the opening of said door and according to the load on the vehicle for positioning said contact means.

20. In a variable load brake equipment for vehicles, in combination, a control pipe, means for supplying fluid under pressure to said control pipe to effect an application of the brakes, a brake cylinder, brake control means having a plurality of chambers and operative according to which chamber or chambers are charged with fluid under pressure for effecting corresponding different degrees of pressure in the brake cylinder under the influence of the same supply pressure, a slide valve for selectively determining which chamber or chambers will be charged with fluid under pressure from the control pipe when an application of the brakes is initiated, means adjusted according to the load on the vehicle for controlling said slide valve, a locking mechanism for locking said means in its adjusted position, a door for the vehicle, and electroresponsive means under the control of said door for controlling said locking means.

21. In a variable load brake equipment for vehicles, in combination, a primary control pipe chargeable with fluid under pressure to initiate an application of the brakes, a secondary control pipe effective to control the degree of application of the brakes in accordance with the degree of fluid pressure established in the secondary control pipe, a valve mechanism for controlling the supply and release of fluid under pressure to and from said secondary control pipe, a differential fluid pressure operated means for operating the valve mechanism, comprising a plurality of abutments of different areas, respectively, and arranged in spaced coaxial relation with the abutments decreasing successively in area, and means controlled according to the load on the vehicle and effective upon the initiation of an application of the brakes for selectively subjecting different ones of said abutments to the unbalanced pressure of the primary control pipe pressure to vary the force urging the valve mechanism in a direction to supply fluid under pressure to the secondary control pipe, the outer face of the largest abutment being subject to the pressure of the secondary control pipe acting to oppose the force of the primary control pipe pressure on the abutments, the pressure established in the secondary control pipe by the valve mechanism being in substantially the same ratio to the pressure in the primary control pipe as the area of the abutment subject to the unbalanced primary control pipe pressure is to the area of the largest abutment.

22. In a variable load brake equipment for vehicles, in combination, a brake cylinder; a control pipe; brake control means comprising a plurality of movable abutments, of different areas respectively, disposed in spaced coaxial relation, each pair of successive abutments having a chamber therebetween, and valve means operated by said abutments responsively to variations in the pressure in said chamber for controlling the degree of pressure in said brake cylinder; means controlled according to the load on the vehicle for selectively determining which chamber or chambers will be connected to said control pipe and thus be charged with fluid under pressure when an application of the brakes is effected; a door for the vehicle, and a magnet valve device operative upon the opening of the door for effecting operation of said means.

23. In a variable load brake equipment for vehicles, in combination, a brake cylinder; a control pipe; brake control means comprising a plurality of movable abutments of different areas respectively, disposed in spaced coaxial relation, each pair of successive abutments having a chamber therebetween, and valve means operated by said abutments responsively to variations in the pressure in said chamber for controlling the degree of pressures in said brake cylinder; means controlled according to the load on the vehicle for selectively determining which chamber or chambers will be connected to said control pipe and thus be charged with fluid under pressure when an application of the brakes is effected; locking means for locking the means controlled by the load on the vehicle in its adjusted position; a device operative periodically to perform a necessary function on the vehicle; and means controlled by the operation of said device for controlling the operation of said locking means.

24. In a variable load brake equipment for vehicles, in combination, valve means operative to control the degree of application and release of the brakes, a plurality of movable abutments, said abutments being so arranged that one of said abutments is effective when subject on one side to fluid at a certain pressure for effecting operation of said valve means to effect a certain degree of application of the brakes, and another of said abutments is effective when subject on one side to fluid at said certain pressure while said one abutment is not subject on the said one side thereof to fluid under pressure, for effecting operation of said valve means to effect a degree of application different from said certain degree, means controlled according to the load on the vehicle for selectively controlling the supply of fluid under pressure to said abutments, a device operative periodically to perform a necessary function on the vehicle, and means controlled as an incident to the operation of said device for controlling the operation of said means.

25. In a variable load brake equipment for vehicles, in combination valve means operative to control the degree of application and release of the brakes, said valve means comprising a plurality of unconnected movable abutments, means cooperating with said movable abutments to form a plurality of pressure chambers associated with said abutments, each of said abutments being responsive to fluid pressure in a corresponding one of said chambers for actuating said valve means; means for selectively controlling the supply of fluid under pressure to said chambers; a lever mechanism adjustable according to the load on the vehicle for positioning said means, a door for the vehicle, and means operative upon the closing of said door for causing said lever mechanism to be locked in its adjusted position.

26. In a variable load brake equipment for vehicles, in combination, a valve device operative to control the degree of application and release of the brakes; said means comprising a plurality of cooperating unconnected movable abutments of different areas so arranged in spaced coaxial relation as to move individually and collectively; means for causing fluid under pressure to be supplied simultaneously to all of the spaces between the successive pairs of abutments, to effect operation of said valve device to establish a certain degree of braking force, or to a varying number less than all of the spaces, to effect operation of said valve device to establish a second certain degree of braking force less than the first said certain degree of braking force; a lever mechanism for controlling the operation of said means; a door for the vehicle, and means operative according to the load on the vehicle when the door is open for effecting operation of the lever mechanism.

27. In a variable load brake equipment for vehicles of the type comprising a vehicle or car truck and a vehicle or car body carried by said truck and which is constructed and arranged for vertical movement relative to the truck, in combination, a brake cylinder, brake control means operatively responsive to the pressure of fluid supplied thereto for controlling the degree of pressure in said brake cylinder; valve means having a plurality of different control positions; said valve means being effective, dependent upon its control position, to condition the brake control means differently so as to establish different fluid pressures in the brake cylinder for the same pressure of fluid supplied to the brake control means; regulating means for adjusting said valve means in any one of its plurality of different control positions comprising a lever operatively connected to said valve means, a piston operatively connected to said lever, a member movable with the car truck, a member movable with the car body and operatively connected to said lever and movable to engage said car truck member; locking means for locking the regulating means in its adjusted position; a door for the vehicle; and means operative upon the closing of said door for effecting operation of said locking means to maintain said regulating means in its adjusted position.

ELLIS E. HEWITT.